(12) United States Patent
Genma et al.

(10) Patent No.: US 7,024,269 B2
(45) Date of Patent: Apr. 4, 2006

(54) NUMERICAL CONTROL APPARATUS

(75) Inventors: Eiji Genma, Yamanashi (JP); Haruhiko Kozai, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/936,665

(22) Filed: Sep. 9, 2004

(65) Prior Publication Data

US 2005/0055126 A1 Mar. 10, 2005

(30) Foreign Application Priority Data

Sep. 10, 2003 (JP) ............... 2003-318781

(51) Int. Cl.
*G06F 19/00* (2006.01)
(52) U.S. Cl. ............... 700/160; 700/182; 700/87; 318/571
(58) Field of Classification Search ............... 700/108, 700/180, 169, 181, 182, 174, 83, 25, 86–87, 700/61, 176, 160, 177, 178, 190, 159, 193; 318/571, 561, 572
See application file for complete search history.

(56) References Cited

U.S. PATENT DOCUMENTS 4,209,847 A * 6/1980 Noda et al. ............... 700/181
5,793,635 A * 8/1998 Niwa ............... 700/192
5,808,432 A * 9/1998 Inoue et al. ............... 318/561
2005/0038552 A1* 2/2005 Sagawa et al. ............... 700/181

FOREIGN PATENT DOCUMENTS

JP 55-067805 5/1980
JP 01-312605 12/1989

OTHER PUBLICATIONS

Japanese Patent Office Action for corresponding Japanese Patent Application No. 2004-261374 dated Oct. 3, 2005.

* cited by examiner

*Primary Examiner*—Kidest Bahta
(74) *Attorney, Agent, or Firm*—Staas & Halsey LLP

(57) ABSTRACT

Foreground program execution means executes a program, and outputs movement commands to a control object. Meanwhile, background program execution means checks abnormalities by executing the program, without outputting the movement commands, obtained by executing the program, to the control object. If a program abnormality is detected by the background program execution means, the abnormality is stored in association with the block in which the abnormality is detected. When the program is executed by the foreground program execution means, the program is interrupted at the end of a preceding block for which a program abnormality was stored.

16 Claims, 3 Drawing Sheets

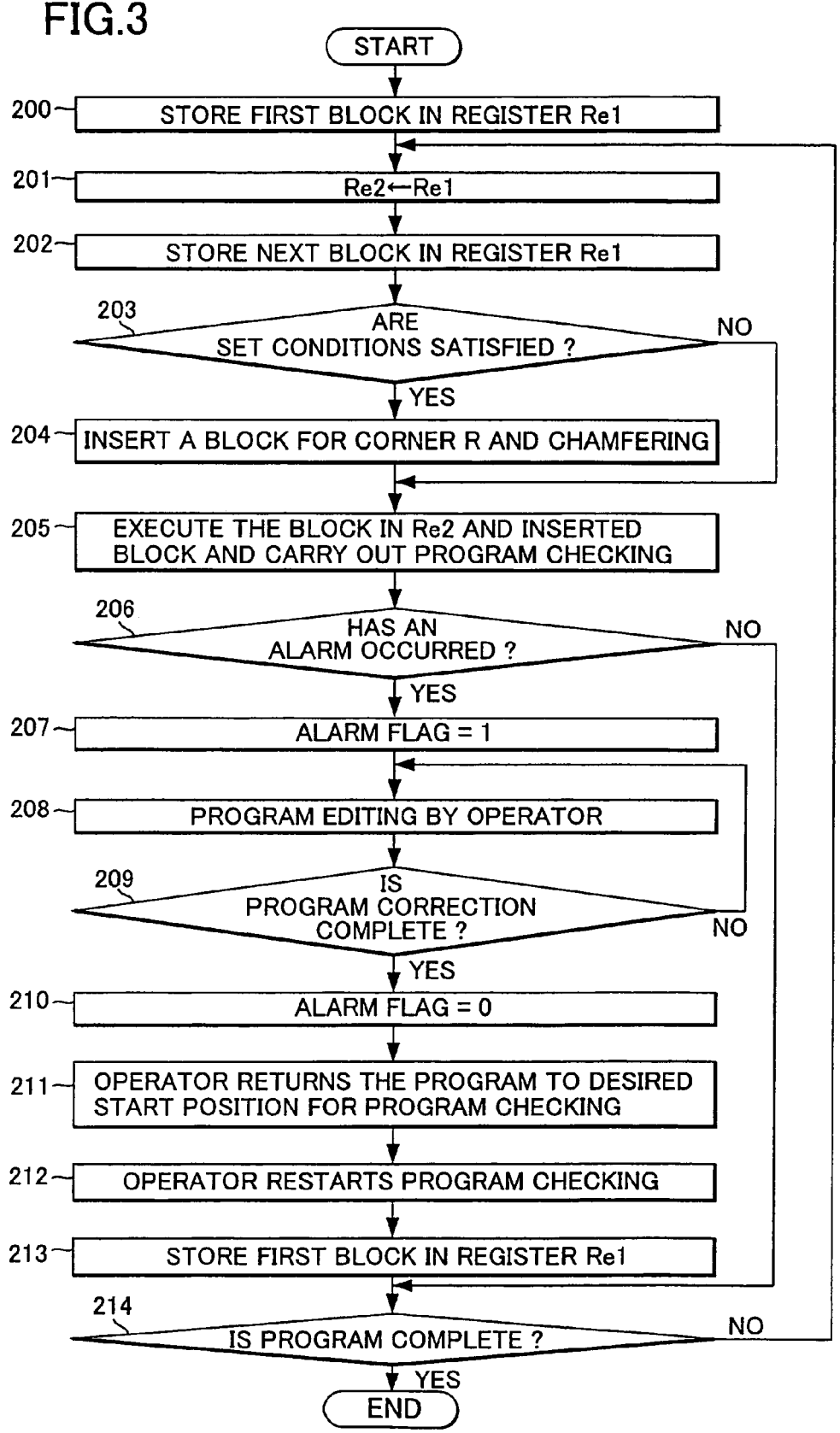

NUMERICAL CONTROL APPARATUS

BACKGROUND OF THE INVENTION

1. Field of the Invention

The present invention relates to a numerical control apparatus, and in particular, to a numerical control apparatus which carries out program checking.

2. Description of the Related Art

When processing is actually carried out by machine tools which are controlled by a numerical control apparatus, checking is done to determine whether the processing program can be correctly executed by doing format checking or stroke limit checking of the processing program. After it is confirmed that the processing program can be correctly executed, the processing program is executed and actual processing is carried out.

In a conventional method in which, prior to carrying out an actual processing, program checking such as format checking or stroke limit checking for processing programs is carried out, the actual processing can not begin until checking of the processing program is complete, and as a result, the operation was inefficient.

SUMMARY OF THE INVENTION

The object of the present invention is to provide a numerical control apparatus in which program checking and actual processing can be efficiently carried out.

The numerical control apparatus according to the present invention controls drive of a control object in accordance with a program, and comprising: foreground program execution means which executes the program and outputs movement commands to the control object; background program execution means which checks an abnormality of the program, by executing the program, without outputting movement commands to the control object which are obtained by executing the program; storing means for storing, when an abnormality of the program is detected by said background program execution means, the abnormality in association with the block in which the abnormality was detected; and means for interrupting the execution of the program at the end of a preceding block for which the abnormality of the program was stored, during the execution of the program by said foreground program execution means, thereby enabling program checking to be carried out in background process at high speed.

The background program execution means may execute the program at maximum feed speed and the maximum acceleration.

The background program execution means may include determination means for determining whether or not conditions are met for inserting a block for corner R and chamfering, as an insert block, between one block and another, and if the determination means determines that the conditions for insertion of the insert block are met, then the insert block is inserted between the blocks and executed, and said background program execution means carries out program checking during execution of said block. The inserted block for corner R and chamfering may be executed during execution of the program for controlling the drive of said control object which is executed in the foreground process.

Further, the numerical control device may comprise an editing means and a program abnormality erasing means, wherein said editing means makes it possible to edit the program when a program abnormality is detected by said background program execution means, and said program abnormality erasing means erases the program abnormality stored in the storing means when correction of the program by said editing means is complete. And this numerical control device may further comprise a designation means for designating any block in the program, wherein after program correction by the editing means, the program is executed by the background program execution means from the block that has been designated by the designating means and program checking is resumed.

According to the present invention, as checking and confirmation of a processing program can be simultaneously carried out with an actual processing, time required for checking and confirmation of a processing program is shortened, so that operation efficiency is improved. Also, even in the case where an alarm occurs due to a program abnormality, an actual process is not affected since the program is corrected by program editing means. Also, if the actual program is interrupted, it can be continued after correction of the program, with the result that the operation can proceed efficiently and securely.

BRIEF DESCRIPTION OF THE DRAWINGS

The forgoing and other objects and feature of the invention will be apparent from the following description of preferred embodiments of the invention with reference to the accompanying drawings, in which:

FIG. 3 is a flow chart of the processes at the background in the numerical control apparatus shown in FIG. 1.

DESCRIPTION OF THE EMBODIMENTS

Figure 1:
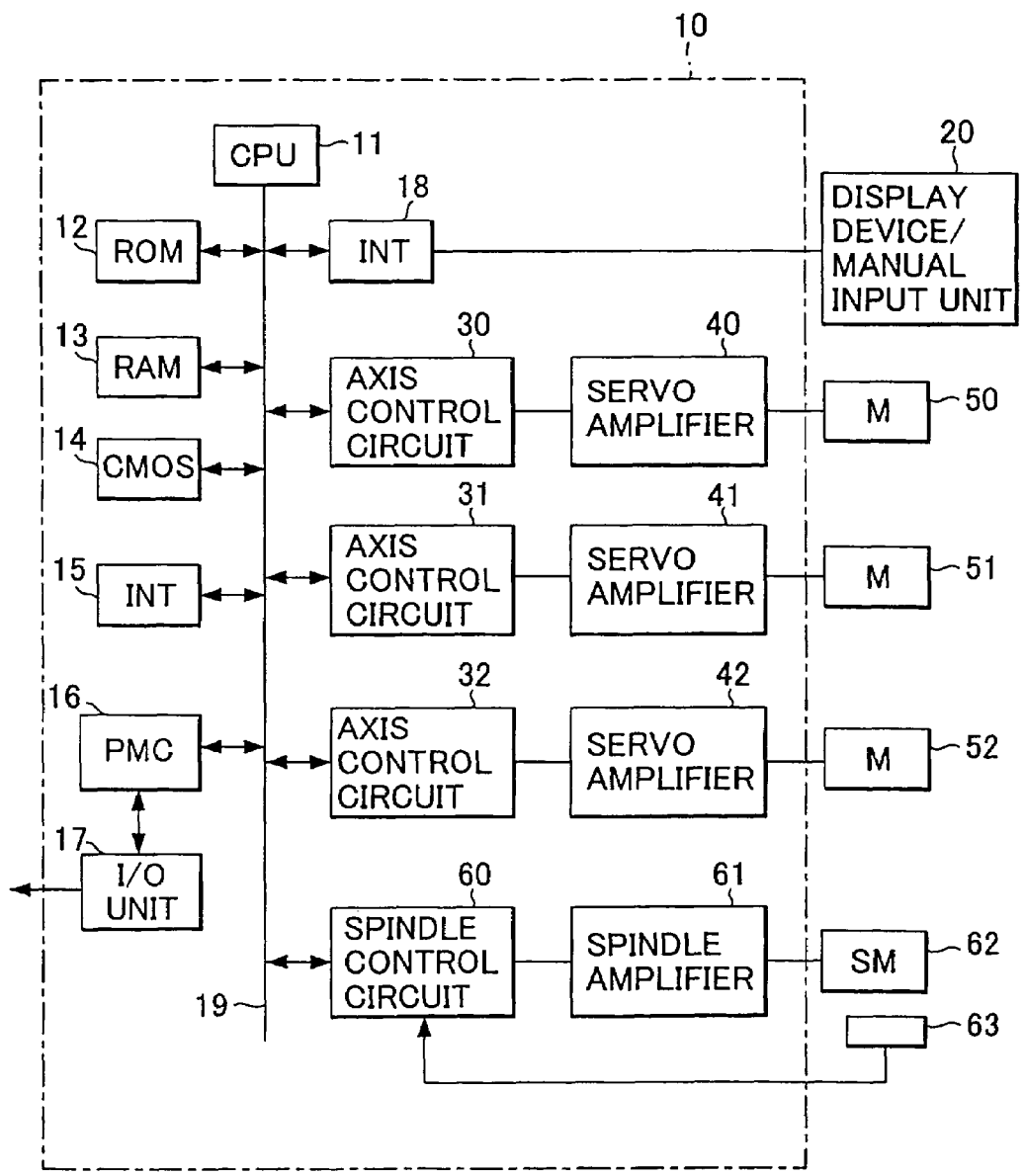
FIG. 1 is a block diagram showing principal parts of an embodiment of the numerical control apparatus according to the invention.

FIG. 1 is a block diagram showing the main parts of the numerical control apparatus 10 according to an embodiment of this invention. The CPU 11 is a processor which carries out overall control of the numerical control apparatus 10. The CPU 11 reads the system program that is stored in the ROM 12 via the bus 19 and the entire numerical control apparatus is controlled by said system program. Temporary calculation data or display data is stored in the RAM 13. Furthermore, various types of data which have been inputted by an operator via the display device/manual input unit 20, having a display constituted by a CRT or liquid crystal and manual data input means constituted by a key-board or the like, are stored in the RAM 13.

The CMOS memory 14 is backed up by batteries which are not shown, and is configured as non-volatile memory in which the memory state is maintained even if the power source of the numerical control apparatus 10 is turned off. Processing programs which are read via the interface 15 and processing programs inputted via the display device/manual input unit 20 and the like are stored in the CMOS memory 14. In addition, various system programs with the necessary editing functions for creating and editing the processing program or for carrying out the foreground processes and background processes described hereinafter are stored in ROM 12 in advance.

The interface 15 allows the numerical control apparatus 10 to be connected to external devices. The PMC (programmable machine controller) 16 uses the sequence program stored in the numerical control apparatus 10 to output signals via the I/O unit 17 to the auxiliary apparatuses (such as actuators for a robot hand or the like for tool replacement) of the machine tools which are to be controlled, thereby controlling those auxiliary apparatuses. In addition, the PMC 16 receives signals from each of the switches and the like of the operation panel which is installed in the main body of the machine tools which are to be controlled by the numerical control apparatus, and after the necessary signal processing is performed, the signals are delivered to the CPU 11.

Axis control circuits 30–32 for the respective axes receive movement command for the respective axes from the CPU 11 and output the commands for the respective axes to the corresponding servo amplifiers 40–42. The servo amplifiers 40–42, receiving the command, drive the servomotors 50–52 for the axes of the machine (which is to be controlled). Each of the servomotors 50–52 has a built-in position/speed detector, and position/speed feed back signals from the position/speed detector are fed back to the axis control circuits 30–32 to thereby carry out position/speed feedback control. It is to be noted that position/speed feedback has been omitted in FIG. 1.

The spindle control circuit 60 receives main axis rotation commands and outputs spindle speed signals to the spindle amplifier 61. The spindle amplifier 61, receiving the spindle speed signals, rotates the main axis motor 62 at the commanded rotation speed. The position coder 63 sends feedback pulses to the spindle control circuit 60 in synchrony with the rotation of the main axis motor 62, thereby carrying out speed control.

The above-described configuration of the numerical control apparatus is the same as the configuration of the numerical control apparatus of the prior art, and, as described hereinafter, the numerical control apparatus according to the present invention differs from the prior art in that regular processing programs are executed in a foreground process in which movement commands are distributed to the axis control circuits 30–32 to drive the servomotors 50–52 for the respective axes, while processing program is executed at a high speed by carrying out numerical processing only, without outputting movement commands to the respective axes, in a background process.

Figure 2:
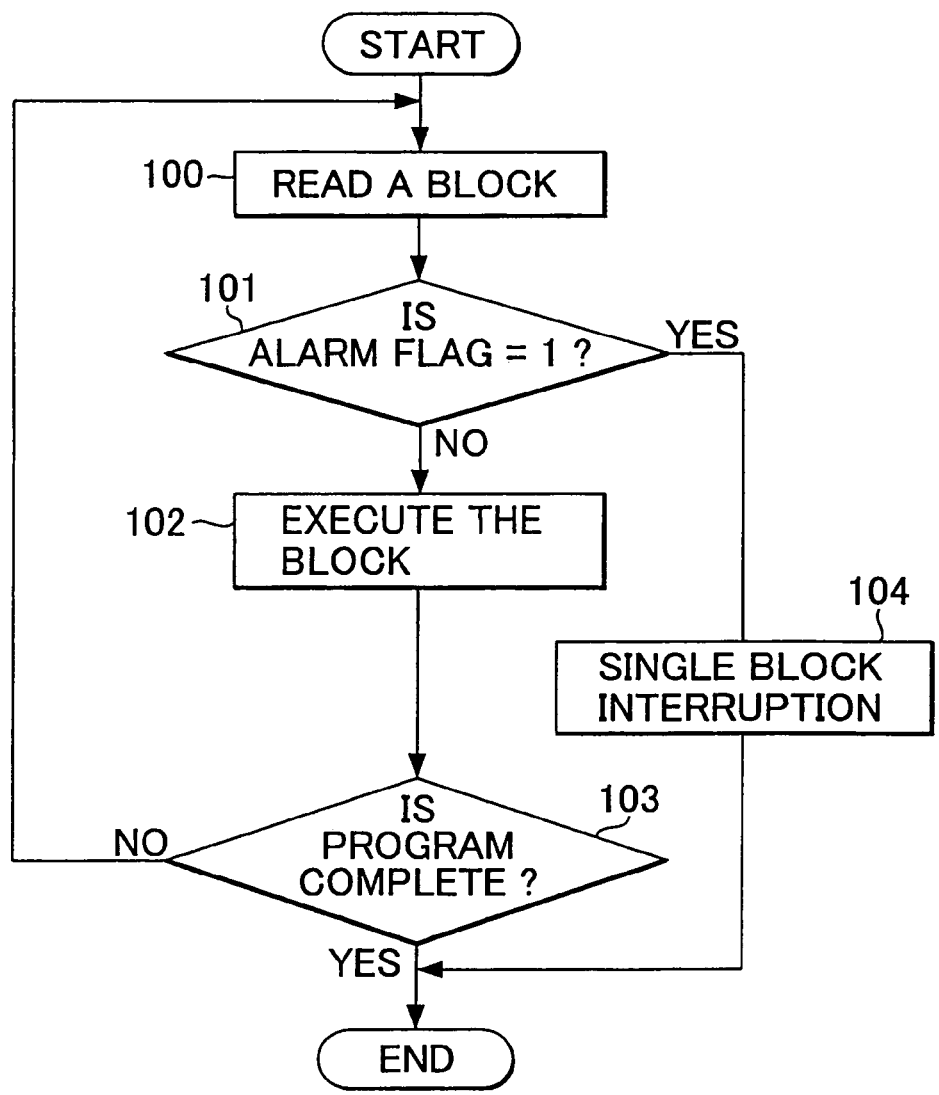
FIG. 2 is a flow chart of the processes at the foreground in the numerical control apparatus shown in FIG. 1.

FIG. 2 is a flowchart of the process that is carried out in the foreground, and FIG. 3 is a flowchart of the background process that is carried out simultaneously and in parallel with the foreground process. The foreground process shown in FIG. 2 is the same as the process of a regular processing program. In the background process, the processing program is executed at the maximum feed speed and maximum acceleration of the machines controlled by the numerical control apparatus 10, and further, movement commands to the respective axes, which are obtained by executing the processing program, are not outputted, but only numerical control is carried to perform a program checking.

When a start command for the execution of the processing program is inputted at the numerical control apparatus 10, the CPU 11 starts the process shown in FIG. 2 in the foreground, and starts the process shown in FIG. 3 in the background. First, the background process will be described.

This background process is executed at a high speed and the first block of the processing program is read and stored in the register Re1 (Step 200), the memory content of said register Re1 is stored in the register Re2 (Step 201), and the next block is read from the processing program and stored in the register Re1 (Step 202). Next a determination is made from the command content stored in the registers Re1 and Re2 as to whether the insertion condition of a block for corner R and chamfering set in advance by means of parameters (Step 203). For example, as has been done in the past, in the case where a block for a corner R and chamfering is to be inserted between blocks of linear movement commands, the condition for the insertion of the block for corner R and chamfering is set in advance by means of parameters.

A determination is made as to whether the conditions set by the parameters are met or not, and in case where the conditions are met, a block for corner R and chamfering is inserted between the blocks which are stored in the registers Re1 and Re2 (Step 204), and the command in the block stored in the register Re2 is executed and the inserted block for corner R and chamfering is executed, and also format checking and stroke limit checking of the processing program are carried out (Step 205).

Furthermore, if determined that the conditions set by means of the parameters at Step 203 are not met, then the process proceeds to Step 205, without inserting the block for corner R and chamfering, to execute the command in the block stored in the register Re2, thereby carrying out program checking.

In executing the program in Step 205, the commanded feed speed is disregarded and the program is executed at the maximum feed speed and the maximum acceleration. A determination is made as to whether difference of the format of the processing program has caused the program abnormality so that an alarm has occurred or not, or as to whether the movement positions for the respective axes, obtained by execution of the program, has exceeded the stroke limit so that an alarm has occurred or not (Step 206). If there are not any format abnormalities and if any of the movement positions for the respective axes does not exceed the stroke limit, then the alarm will not occur, with the result that the process proceeds to Step 214.

Meanwhile, in the case where the alarm occurs, an alarm flag is set to "1" in the memory in association with the current block (the block stored in the register Re2) and the program abnormality is stored (Step 207) allowing an operator to edit the program (Step 208). The operator corrects the program abnormality through the display device/manual input unit 20, and when the program repair completion command is inputted (Step 209), the stored alarm flag is reset to "0" (Step 210). When the operator brings the program back to the desired program checking position and inputs the restart command for program checking (Step 211, 212), the CPU 11 stores the first block at the program checking position, brought back by the operator, in the register Re1 (Step 213). Then, a determination is made as to whether the program proceeds to the end or not (Step 214), and when proceeding to the end, the process returns to Step 201 and the above-described processes at Step 201 and following steps are carried out.

As described above, the processing program is executed in the background at maximum feed speed and maximum acceleration and program checking is carried out a high speed without distributing movement commands to the respective axes. In addition, if there is a program abnormality, the alarm flag is set to "1" and correction of the program is carried out. When the correction of the program is complete, the alarm flag is reset to "0".

Meanwhile, in the foreground process, as shown in FIG. 2, a processing program which is the same as that of the prior art is carried out. The block is read (Step 100), and a determination is made as to whether the alarm flag for said block is set to "1" or not (Step 101). When not set to "1", the current block is executed and a movement command is distributed to the respective axes control circuits 30–32, so that the servomotors 50–52 for the respective axes are driven (Step 102). Then, a determination is made as to whether the program proceeds to the end or not (Step 103). When not proceeding to the end, the process returns to Step 100. When detected that the alarm flag is "1" at Step 101, a single block interruption is carried out without executing the block which was read at Step 100 (Step 104). Thereafter, this interrupted state is maintained until a start command for resumption is inputted.

It is to be noted that a block for corner R and chamfering, inserted in the background process, is executed as a block of processing program in this foreground process. In this case, speed reduction between the blocks may be reduced, and actual processing time may be shortened.

As described above, if the alarm flag is set to "1", the block is not executed and single block interruption is carried out. Thus, actual processing for a block where program abnormality occurs is not carried out. When an operator corrects the program, the alarm flag is reset to "0" (Steps 208–210). Accordingly, when the operator, completing the correction of the program, inputs a start command for resumption, the processes at Step 100 and subsequent steps are started from the interrupted program position, in the foreground process. Also, as the background process is carried out at high speed, correction of the program tends to be completed prior to the interruption of an actual processing due to an occurrence of an alarm. When the correction of a program is complete, the alarm flag is reset to "0", so that processing can be continued without interruption.

What is claimed is:

1. A numerical control apparatus which controls drive of a control object in accordance with a program, comprising:
    foreground program execution means which executes the program and outputs movement commands to the control object;
    background program execution means which checks an abnormality of the program, by executing the program, without outputting movement commands to the control object which are obtained by executing the program;
    storing means for storing, when an abnormality of the control program is detected by said background program execution means, the abnormality in association with the block in which the abnormality was detected; and
    means for interrupting the execution of the program at the end of a block immediately before the block where the abnormality of the program was stored, during the execution of the program by said foreground program execution means.

2. The numerical control device according to claim 1, wherein said background program execution means executes the program at maximum feed speed and the maximum acceleration.

3. The numerical control device according to claim 1, wherein said background program execution means includes determination means for determining whether or not conditions are met for inserting a block for corner R and chamfering, as an insert block, between one block and another, and if the determination means determines that the conditions for insertion of the insert block are met, then the insert block is inserted between the blocks and executed, and said background program execution means carries out program checking during execution of said block.

4. The numerical control device according to claim 3, wherein said inserted block for corner R and chamfering is executed during execution of the program for controlling the drive of said control object which is executed in the foreground process.

5. The numerical control device according to claim 1, further comprising an editing means and a program abnormality erasing means, wherein said editing means makes it possible to edit the program when a program abnormality is detected by said background program execution means, and said program abnormality erasing means erases the program abnormality stored in the storing means when correction of the program by said editing means is complete.

6. The numerical control device according to claim 5, further comprising a designation means for designating any block in the program, wherein, after program correction by the editing means, the program is executed by the background program execution means from the block that has been designated by the designating means and program checking is resumed.

7. A numerical control system comprising:
    a foreground program executing a control program that outputs movement commands to control a machining apparatus;
    a background program detecting an abnormality of the control program at maximum feed speed and maximum acceleration before the foreground program execution, wherein the background program includes a process for detecting abnormalities within the control program, without outputting movement commands to the machining apparatus;
    a storing unit storing abnormalities detected by the background program within a block in which the abnormality was detected; and
    an interruption unit interrupting the execution of the control program at the end of a block immediately before the block where the abnormality of the control program was stored and detected, during the execution of the foreground program.

8. The numerical control system according to claim 7, wherein the background program determines whether or not conditions are met for inserting an insert block for corner R and chamfering, between one program block and another program block within the control program, and if it is determined that the conditions for insertion of the insert block are met, then the insert block is inserted between the program blocks and executed, and the background program carries out the process for detecting abnormalities during execution of the insert block.

9. The numerical control system according to claim 8, wherein the foreground programs executes the control program containing the insert block for corner R and chamfering, to output movement commands to the machining apparatus.

10. The numerical control system according to claim 7, further comprising:
    an editing process which edits the control program when a program abnormality is detected by the background program, wherein the control program abnormality stored in the block is erased when correction of the control program by the editing process is complete.

11. The numerical control system according to claim 10, further comprising:
    a designation process which designates any block within the control program to be executed by the background program; and
    after the designated block has been corrected by the editing process, the background program executes the control program from the designated block and resumes checking for abnormalities.

12. A method comprising:

controlling operation of a control object by providing numerical control in accordance with a control program;

executing a foreground program for outputting movement commands to the control object which are obtained by executing the control program;

executing a background program for checking abnormalities of the control program at maximum feed speed and maximum acceleration, without outputting movement commands to the control object which are obtained by executing the control program;

storing abnormalities detected by the background program, the abnormality associated with a program block in which the abnormality was detected and stored; and interrupting execution of the foreground program at the end of a program block immediately before the control program block where the abnormality of the control program was detected and stored.

13. The method according to claim 12, further comprising:

determining within the background program, whether or not conditions are met for inserting a program block for corner R and chamfering, between one program block and another program block within the control program;

inserting the insert block between the program blocks and executing the insert bock if it is determined that the conditions for insertion of the insert block are met; and using the background program to carry out abnormality checking during the execution of the insert block within the control program.

14. The method according to claim 13, further comprising:

executing the insert block for corner R and chamfering during execution of the control program within the foreground program to output movement commands to the control object.

15. The method according to claim 13, further comprising:

correcting the abnormality in the control program by editing the control program and once editing is complete, erasing the abnormality stored within the associated program block.

16. The method according to claim 15, further comprising:

designating any block within the control program, wherein, after editing of the control program, the background program executes the control program from the designated block and resumes checking for abnormalities.

* * * * *

UNITED STATES PATENT AND TRADEMARK OFFICE
CERTIFICATE OF CORRECTION

PATENT NO. : 7,024,269 B2
APPLICATION NO. : 10/936665
DATED : April 4, 2006
INVENTOR(S) : Eiji Genma et al.

It is certified that error appears in the above-identified patent and that said Letters Patent is hereby corrected as shown below:

Column 2, line 5, after "wherein" insert --,--

Column 3, line 17, change "feed back" to --feedback--

Column 5, line 40, before "program" (first occurrence), delete "control"

Column 8, line 2, change "bock" to --block--

Signed and Sealed this

Fifteenth Day of August, 2006

JON W. DUDAS
*Director of the United States Patent and Trademark Office*